(12) United States Patent
Miyake

(10) Patent No.: US 6,469,857 B2
(45) Date of Patent: Oct. 22, 2002

(54) DRIVE CIRCUITS FOR A MAGNETIC RECORDING DEVICE

(75) Inventor: Shigekazu Miyake, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/909,802

(22) Filed: Jul. 23, 2001

(65) Prior Publication Data

US 2001/0040747 A1 Nov. 15, 2001

Related U.S. Application Data

(62) Division of application No. 09/105,267, filed on Jun. 26, 1998, now Pat. No. 6,292,321.

(30) Foreign Application Priority Data

Jun. 27, 1997 (JP) ............................................. 9-172389

(51) Int. Cl.[7] .............................. G11B 5/02; G11B 5/09
(52) U.S. Cl. ........................................ 360/67; 360/46
(58) Field of Search ............................. 360/67, 68, 46

(56) References Cited

U.S. PATENT DOCUMENTS 5,055,969 A    10/1991  Putnam ................... 360/264.2
5,999,353 A    12/1999  Hase et al. .................... 360/51
6,268,160 B1 * 10/2000  Yamamoto .................... 360/66

* cited by examiner

Primary Examiner—Regina N. Holder
(74) Attorney, Agent, or Firm—Sughrue Mion, PLLC

(57) ABSTRACT

A drive circuit for a magnetic recording device is provided in which the stray capacitance and stray inductance of the peripheral wiring of the drive circuit is reduced. Also, the drive circuit increases the read/write frequency of data and the recording density of the magnetic recording device. Specifically, the drive circuit contains a write driver, a read preamplifier, a write predriver, a read postamplifier, and a current signal detecting circuit. The write driver inputs write data and outputs a corresponding writing current to a write head to store information onto a magnetic disk. The read preamplifier supplies a bias current to a read magnetic head to sense information stored on the magnetic disk and amplifies the information as output data. The write predriver inputs a write data signal via a data signal line and a write mode signal and supplies the write data to the write driver based on the write mode signal. The read postamplifier inputs the output data and a read mode signal and amplifies the output data to produce a read data signal based on the read mode signal. The current signal detecting circuit inputs an external current setting signal via the data signal line and generates a current value signal based on the external current setting signal.

37 Claims, 10 Drawing Sheets

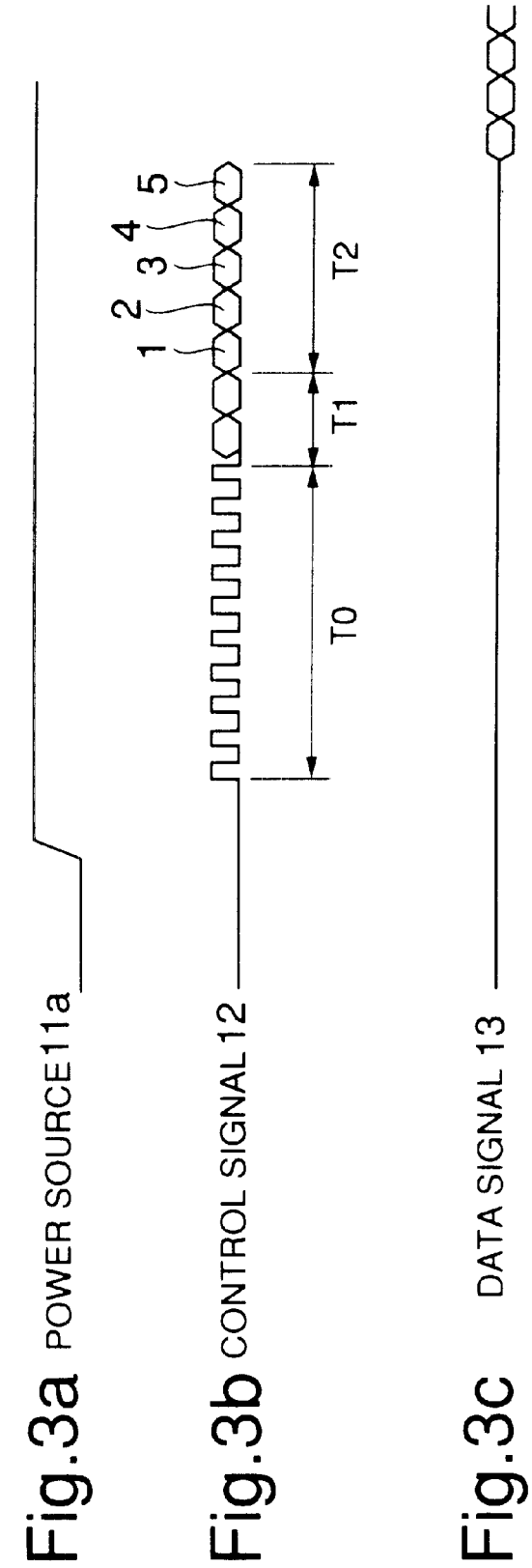

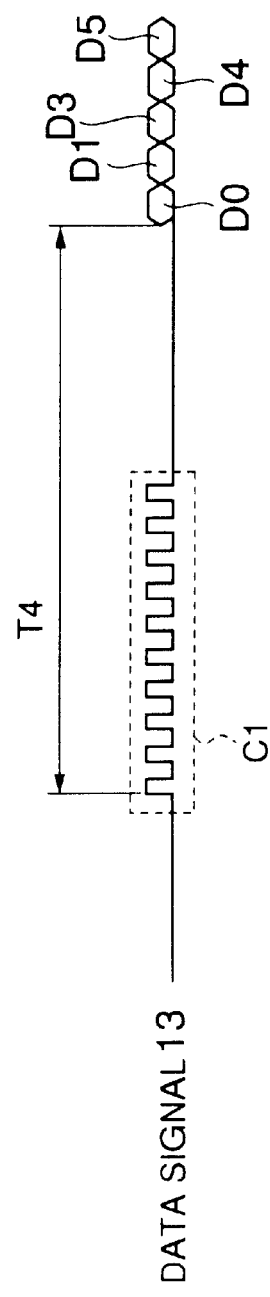

DRIVE CIRCUITS FOR A MAGNETIC RECORDING DEVICE

This is a divisional of application Ser. No. 09/105,267 filed Jun. 26, 1998, the disclosure of which is incorporated herein by reference now U.S. Pat. No. 6,292,321.

FIELD OF THE INVENTION

The present invention relates to a drive circuit for a magnetic recording device. More particularly, the present invention relates to a drive circuit for a magnetic hard disk drive.

BACKGROUND OF THE INVENTION

FIG. 6a illustrates a conventional drive circuit 15 for driving a magnetic hard disk drive. As shown in the figure, the drive circuit 15 is connected to magnetic heads 3 to 6. The magnetic heads 3 and 4 are respectively disposed near the upper and lower surfaces of a first disk 1, and the magnetic heads 5 and 6 are respectively disposed near the upper and lower surfaces of a second disk 2. The disks 1 and 2 rotate around a rotary shaft 7, and thus, the heads 3 to 6 are capable of selectively writing and reading data to and from the surfaces of the disks 1 and 2. Generally, the magnetic heads 3 to 6 are respectively provided at the tips of swing arms (not shown) to move the heads 3 to 6 in the radial direction of the disks 1 and 2 when the swing arms move within a movable range 9. The drive circuit 15 is provided in the vicinity of the swing arms and is typically connected to the magnetic heads 3 to 6 via wires which have lengths of several centimeters. Thus, the drive circuit 15 is capable of reading and writing data to and from the disk by outputting and receiving signals to and from the heads 3 and 6 via the wires. Also, the drive circuit 15 is connected to an input/output signal bus 8 so that it can exchange signals with an external circuit such as read channel LSI.

FIG. 6b is a block diagram showing an example of the interaction between a CPU 100, a read channel LSI (i.e. a control circuit) 102, and the drive circuit 15. The CPU 100 exchanges data and commands with the read channel LSI 102, and the read channel LSI 102 inputs or outputs various signals to and from the drive circuit 15.

FIG. 7 illustrates the detailed configuration of the conventional drive circuit 15 shown in FIG. 6a and the various signals it receives from and transmits to the read channel LSI 102. As shown in the figure, the circuit 15 comprises a read/write circuit 200, a read postamplifier 23, a read/write switching circuit 34, a head selection circuit 35, and a write current generation circuit 36. Also, the read/write circuit 200 comprises write drivers 26 to 29 and read preamplifiers 30 to 33. In addition, the magnetic heads 3 to 6 respectively contain write heads 3a to 6a and read heads 3b to 6b.

When data is written to a disk (e.g. the disk 1) via a particular write head (e.g. write head 3a), a chip selection signal 57 and a read/write selection signal 56 are supplied from an external control circuit (e.g. the read channel LSI 102) to the read/write switching circuit 34. The chip selection signal 57 enables the drive circuit 15 and sets it in an operational state, and the read/write selection signal 56 indicates whether a read operation or a write operation is to be performed. In the present example, the signal 56 indicates that a write operation is to be performed. In response to such signals 56 and 57, the switching circuit 34 outputs a read/write mode signal indicating that a write operation is to be performed.

The external control circuit also outputs a two bit head selection signal 51 and 52 to the head selection circuit 35 for selecting one of the four heads 3 to 6. The circuit 35 inputs the signal 51 and 52 and determines that the magnetic head 3 has been selected to perform a read or write operation. As a result, the circuit 35 outputs an enable signal to enable the write driver 26 and read preamplifier 30 which are connected to the magnetic head 3.

The write current generation circuit 36 inputs the read/write mode signal from the read/write switching circuit 34, a predetermined write bias current, and a write data signal 53. The predetermined write bias current is generated by connecting an external resistor 55 between the write current terminal 54 and ground. Since the read/write mode signal from the circuit 34 indicates a write mode, the generation circuit 36 outputs the predetermined write bias current based on the write data 53 to the write drivers 26 to 29. Since the enable signal output from the head selection circuit 35 enables the write driver 26, the write driver 26 drives the write head 3a with the write bias current output from the generation circuit 36 to write data to the magnetic disk 1. For example, if a logic "1" is to be written to the disk 1, the write driver causes the write bias current to travel in one direction through the write head 3a. On the other hand, if a logic "0" is to be written to the disk 1, the write driver causes the write bias current to travel in the other direction through the write head 3a.

When current is read from a disk (e.g. the disk 1) via a particular read head (e.g. read head 3b), the chip selection signal 57 sets the drive circuit 15 in an operational state, and the read/write selection signal 56 indicates that a read operation is to be performed. As a result, the switching circuit 34 outputs a read/write mode signal indicating a read mode.

Also, the circuit 35 inputs the head selection signal 51 and 52 and determines that the magnetic head 3 has been selected to perform a read or write operation and enables the write driver 26 and read preamplifier 30. As a result, the read preamplifier 30 inputs a predetermined read current and applies a read bias current to the read head 3b based on the predetermined read current so that the head 3b reads data from the disk 1 and supplies it to the preamplifier 30. The predetermined read current is generated by connecting an external resistor 61 between the read current terminal 60 and ground.

Then, the preamplifier 30 amplifies the signal received from the head 3b and supplies the amplified signal to the postamplifier 23. The read head 3b may be a magnetic-to-electrical resistor which changes resistance based on the magnetic field applied to the resistor. Thus, when a logic "0" on the disk passes by the head 3b, the head 3b has one resistance, and when a logic "1" on the disk passes by the head 3b, the head 3b has another resistance. Thus, the read bias current flowing through the head 3b changes depending on the read data, and thus, the value of the data can be determined based on the changing current. Since the read/write mode signal from the circuit 34 indicates a read mode, the postamplifier 23 amplifies the signal from the preamplifier 30 and outputs it as read data 58 and 59.

The above example illustrates the operation of the drive circuit 15 when data is written to the disk 1 via the write head 3a and when data is read from the disk 1 via the read head 3b. Also, the circuit 15 operates in a similar manner when data is being written via the write heads 4a to 6a and when data is being read via the read heads 4b to 6b.

Recently, increasing the storage capacity of hard disk drives has become extremely desirable. One method of increasing such capacity is to increase the frequency of the write data signal so that a larger amount of data can be stored in a fixed area of a magnetic disk. In other words, the speed at which data is written to or read from the disk is increased. The recording frequency can be raised by decreasing the inductance of the write head. However, when the inductance of the write head decreases, the level of stray inductance which will adversely affect the write operation also decreases. Specifically, the write head is unable to properly write data to the disk if the amount of stray inductance surrounding the write head exceeds 10% of the inductance of the write head itself. Therefore, by lowering the inductance of the head, the sensitivity of the head to stray inductance increases, and thus, the recording frequency of data cannot be increased beyond a certain point by lowering the inductance of the write head.

With respect to the conventional drive circuit 15 discussed above, the chip area of the circuit 15 is large because many external components must be connected to the drive circuit 15, and thus, the wiring surrounding the drive circuit 15 becomes complicated. As a result, the distance between the drive circuit 15 and the magnetic heads 3 to 6 is relatively large, and thus, a substantial amount of stray inductance is present around the heads 3 to 6. Accordingly, the size of the heads 3 to 6 cannot be significantly reduced, and the recording frequency of the drive circuit 15 cannot be significantly increased.

Specifically, as shown in FIG. 7, nine terminals are provided to connect the drive circuit 15 to the external control circuit and the resistors 55 and 61. Therefore, the size of the drive circuit must be increased to adequately separate the terminals to avoid a signal crosstalk between the signals input to and output from the terminals. Accordingly, a large amount of stray inductance exists around the drive circuit 15. In order to prevent the stray inductance from effecting the read and write operations of the heads 3 to 6, the inductance of the heads 3 to 6 must be relatively high. As a result, the storage capacity of the disk drive and recording frequency of the drive circuit 15 cannot be increased. Alternatively, the effects of the stray inductance may be avoided by separating the drive circuit 15 and the heads 3 to 6 via a large distance. However, in such case, the size of the hard disk drive cannot be made compact.

SUMMARY OF THE INVENTION

An object of the present invention is to provide a drive circuit for a magnetic recording device in which the stray capacitance and stray inductance of peripheral wiring of the drive circuit is reduced.

Another object of the present invention is to increase the read/write frequency of data of a magnetic recording device.

A further object of the present invention is to increase the recording density of the magnetic recording device.

An additional object of the present invention is to provide a drive circuit for a magnetic recording device in which the operation characteristics do not deteriorate when the peripheral wiring of the drive circuit is formed by a high-impedance metal evaporation process.

A still further object of the present invention is to provide a drive circuit for a magnetic recording device in which the write bias current and read bias current can be easily optimized to the most appropriate current value.

In order to achieve the above and other objects, a drive circuit for a magnetic recording device is provided. The drive circuit comprises: a write driver which inputs write data and outputs a corresponding writing current to a write head to store information onto a magnetic disk; a read preamplifier which supplies a bias current to a read magnetic head to sense information stored on said magnetic disk and which amplifies said information as output data; a write predriver which inputs a write data signal via a data signal line and a write mode signal and which supplies said write data to said write driver based on said write mode signal; a read postamplifier which inputs said output data and a read mode signal and which amplifies said output data to produce a read data signal based on said read mode signal; and a current signal detecting circuit which inputs an external current setting signal via said data signal line and generates a current value signal based on said external current setting signal.

In order to further achieve the above and other objects, a drive circuit for a magnetic recording device is provided. The drive circuit comprises: a write driver which is driven by said a current setting signal, inputs write data, and outputs a corresponding writing current to a write head to store information onto a magnetic disk; a read preamplifier which is driven by a bias current setting signal, supplies a bias current to a read magnetic head to sense information stored on said magnetic disk, and amplifies said information as output data; a write predriver which inputs a write data signal via a data signal line and a write mode signal and which supplies said write data to said write driver based on said write mode signal; a read postamplifier which inputs said output data and a read mode signal and which amplifies said output data to produce a read data signal based on said read mode signal; a current signal detecting circuit which inputs an external current setting signal via said data signal line and generates a current value signal based on said external current setting signal; a mode selection circuit which inputs a control signal and generates said write mode signal and said read mode signal based on said control signal; and a current setting circuit which inputs said current value signal and outputs said write current setting signal and said bias current setting signal based on said current value signal.

BRIEF DESCRIPTION OF THE DRAWINGS

The above objects and advantages of the present invention will become more apparent by describing in detail preferred embodiments thereof with reference to the attached drawings in which:

FIG. 3a is a waveform diagram of a power signal input to the drive circuit shown in FIG. 2a;

FIG. 3b is a waveform diagram of a control signal input to the drive circuit shown in FIG. 2a;

FIG. 3c is a waveform diagram of a data signal input to or output from the drive circuit shown in FIG. 2a;

FIG. 5a is a waveform diagram of a power signal input to the drive circuit shown in FIG. 4a;

FIG. 5b is a waveform diagram of a control signal input to the drive circuit shown in FIG. 4a;

FIG. 5c is a waveform diagram of a data signal input to or output from the drive circuit shown in FIG. 4a;

DETAILED DESCRIPTION OF THE PREFERRED EMBODIMENTS

The following description of the preferred embodiments discloses specific configurations and components. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations and components of the present invention which would have been known to one skilled in the art are omitted for the sake of clarity and brevity.

Figure 1:
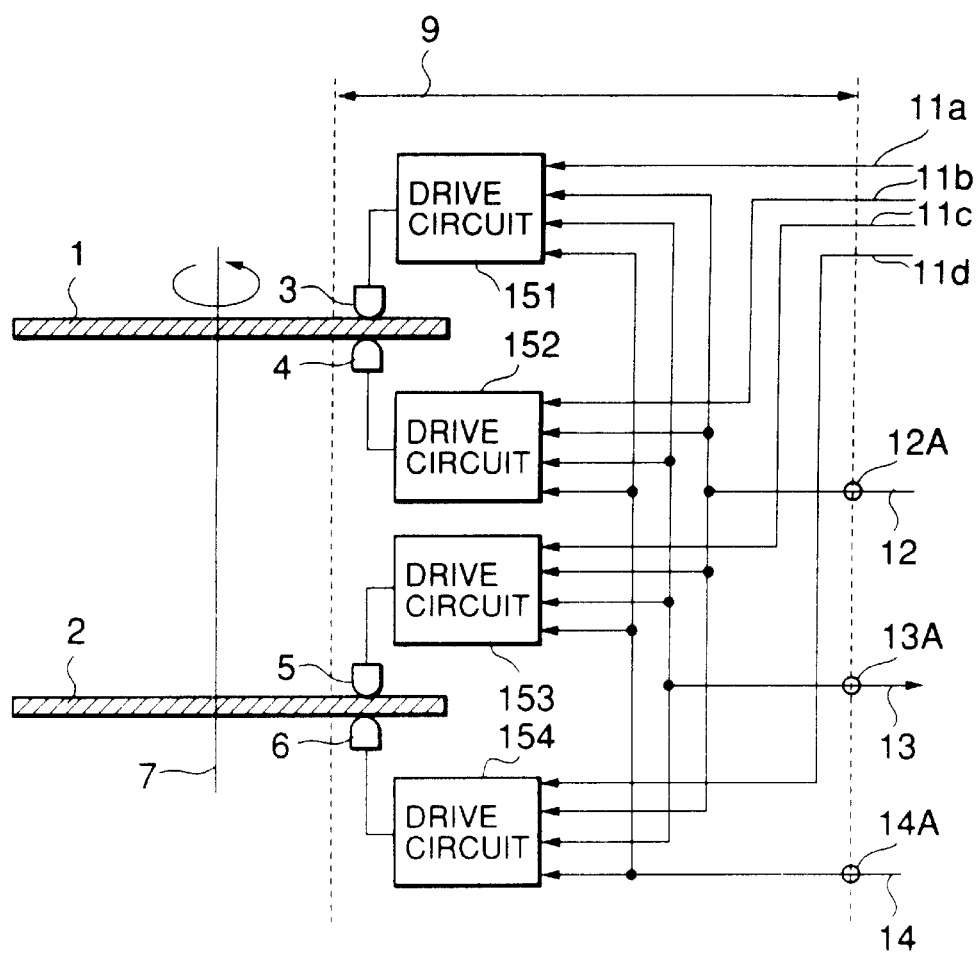
FIG. 1 is a block diagram of a magnetic recording device which incorporates a drive circuit according to a first embodiment of the present invention.

FIG. 1 illustrates a magnetic recording device (i.e. a hard disk drive) which incorporates a drive circuit according to a first embodiment of the present invention. As shown in the figure, the disk drive comprises first and second disks 1 and 2, magnetic heads 3 to 6, and drive circuits 151 to 154.

The magnetic head 3 is disposed near an upper surface of the first disk 1, and the magnetic head 4 is disposed near a lower surface of the first disk 1. Similarly, the magnetic head 5 is disposed near an upper surface of the second disk 2, and the magnetic head 6 is disposed near a lower surface of the second disk 2. When the disks 1 and 2 rotate around a rotary shaft or axis 7, the heads 3 to 6 move with respect to the surfaces of the disks 1 and 2 and can read and write data to and from the disks 1 and 2. Also, the heads 3 to 6 are respectively connected to swing arms (not shown) and can be moved in the radial direction of the disks 1 and 2 by moving the swing arms within a swing arm movement range 9.

Drive circuits 151 to 154 are respectively disposed very close to the magnetic heads 3 to 6 and control the reading and writing operations of the heads 3 to 6. Also, the drive circuits 151 to 154 may be respectively packaged on the actual swing arms on which the heads 3 to 6 are mounted by using a bump technique. In the bump technique, solder is put on the swing arms, and the drive circuits 151 to 154 are mounted on the swing arms via the solder near the heads 3 to 6.

Various signals are also transmitted between the drive circuits 151 to 154 and an external device (i.e. an external controller or processing circuit such as a read channel LSI). Specifically, control signals 12 are input via a control signal terminal 12A and output to all of the drive circuits 151 to 154 in parallel. Also, data signals 13 are input via a data signal terminal 13A and output to all of the circuits 151 to 154 in parallel. Similarly, data signals 13 may be output from the circuits 151 to 154 via the terminals 13A.

Also, each of the four drive circuits 151 to 154 are connected to a ground signal 14 via a ground terminal 14A and are supplied with power signals 11a to 11d from a power source. The power signals 11a to 11d are respectively connected to power source drive terminals within the drive circuits 151 to 154 to supply power to the circuits 151 to 154. Also, the power signals 11a to 11d serve as chip select signals for selectively activating one of the circuits 151 to 154 by only supplying one of the signals 11a to 11d to one (or none) of the circuits 151 to 154 at any given instant. Thus, since all of the drive circuits 151 to 154 are not simultaneously activated, the consumption of power is reduced.

Figure 2A:
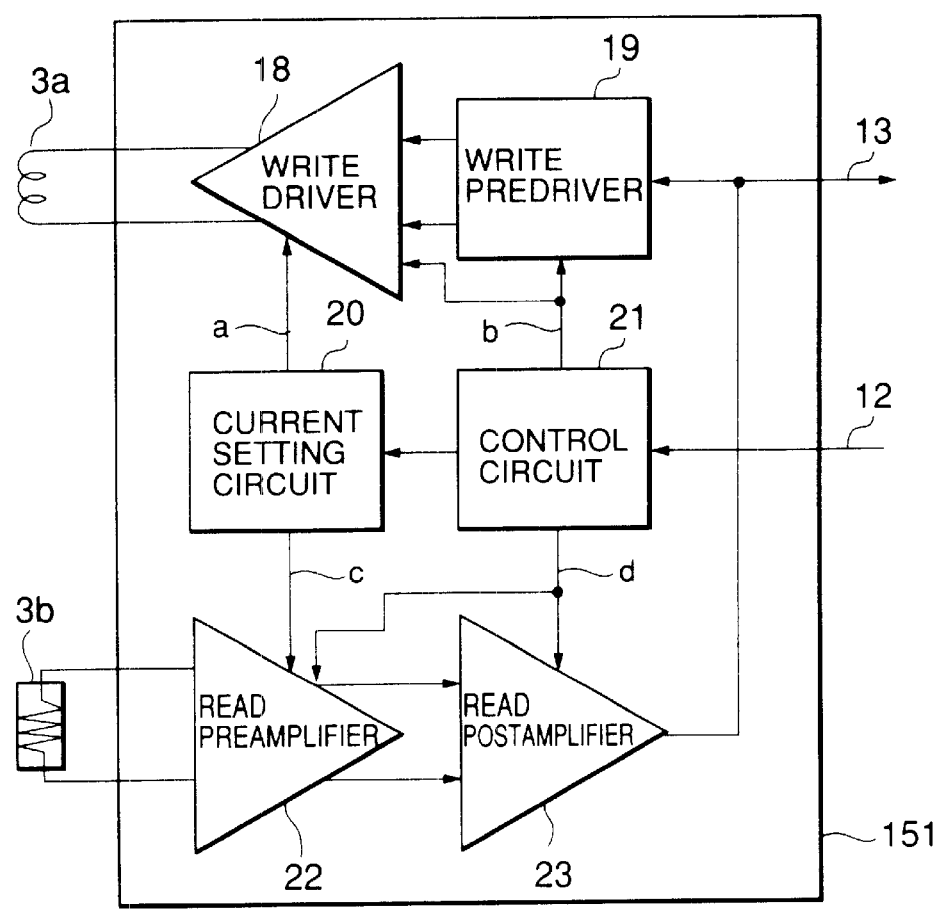
FIG. 2a is a block diagram of a drive circuit according to the first embodiment of the present invention.

FIG. 2a shows an illustrative example of the structure of the drive circuit 151. Also, since the circuits 152 to 154 have a similar structure, a description of such circuits 152 to 154 is omitted for the sake of brevity. Also, FIG. 3 illustrates various signals input to or output from the drive circuit 151.

As shown in FIG. 2a, the drive circuit 151 comprises a write driver 18, a write predriver 19, a current setting circuit 20, a control circuit 21, a read preamplifier 22, and a read postamplifier 23. Also, the magnetic head 3 comprises a write head 3a and a read head 3b.

In order to write data to the disk 1 via the write head 3a, a power signal 11a is selectively applied to the power source terminal (not shown) of the drive circuit 151 as a chip select signal to selectively activate such circuit 151 at a certain time. (FIG. 3a). In other words, none of the other power signals 11b to 11d are respectively supplied to the drive circuits 152 to 154.

After receiving the power signal 11a, the control circuit 21 begins operating and inputs the control signal 12. As shown in FIG. 3b, the control signal 12 supplies a basic clock signal during a first period T0, supplies a two-bit read/write mode control signal during a second period T1, and supplies a five-bit current setting signal during the period T2.

Figure 2B:
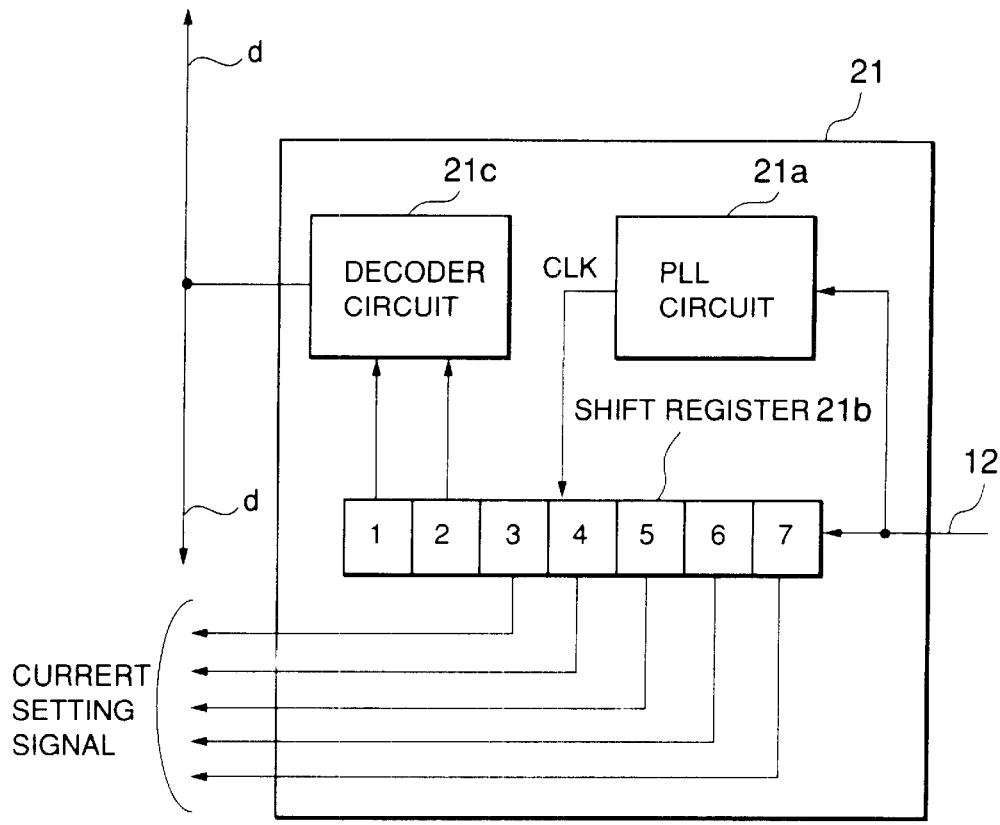
FIG. 2b is a block diagram of a control circuit according to the first embodiment of the present invention.

As shown in FIG. 3b, the basic clock signal is a ten-bit square wave having ten pulses. During the period T0, the control circuit 21 inputs the basic clock signal and synchronizes its operations based on the timing of the basic clock signal. As shown in FIG. 2b, the control circuit 21 may comprise a phase lock loop ("PLL") circuit 21a, a shift register 21b, and a decoder circuit 21c. The PLL circuit 21a receives the clock signal during the period T0 and appropriately synchronizes the various components of the control circuit 21 with the clock signal. The shift register 21b serially inputs the two-bit read/write mode control signal during the period T1 and the five-bit current setting signal during the period T2. After receiving such signals, the register 21b outputs the read/write mode control signal from its bit positions 1 and 2 to the decoder circuit 21c. Then, the decoder circuit 21c decodes the two-bit signal to generate a write mode signal "b" and a read mode signal "d". Since a write operation is to be performed, the control circuit 21 outputs the write mode signal "b" to the write driver 18 and the write predriver 19 to activate the predriver 19. The signals "b" and "d" may be output via a common control signal line to the write driver 18, the write predriver 19, the read preamplifier 22, and the read postamplifier 23. Thus, the driver 18 and predriver 19 may be activated when a logic "1" is output on the common control signal line (i.e. the write mode signal "b" is output), and the preamplifier 22 and postamplifier 23 may be activated when a logic "0" is output on the common signal line (i.e. the read mode signal "d" is output). Alternately, the signals "b" and "d" may be output via two different control signal lines.

Figure 2C:
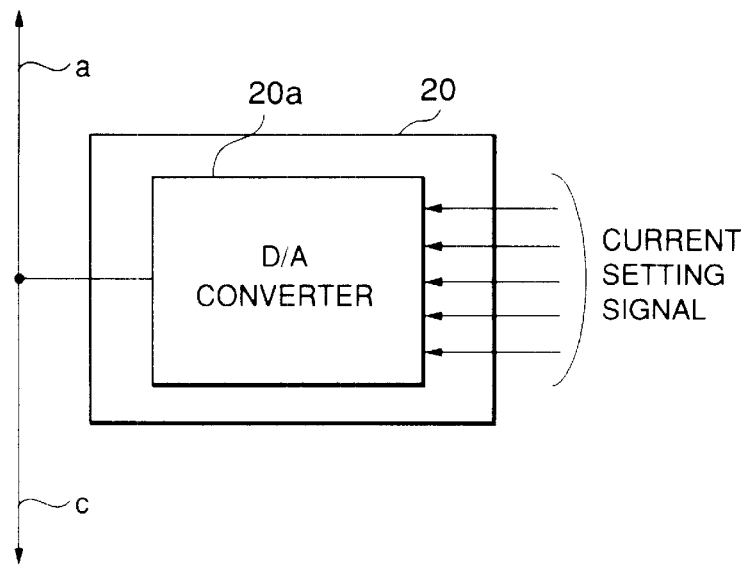
FIG. 2c is a block diagram of a current setting circuit according to the first embodiment of the present invention.

The five-bit current setting signal is supplied from bit positions 3 to 7 of the shift register 21b to the current setting circuit 20. As shown in FIG. 2c, the current setting circuit 20 comprises a digital-to-analog ("D/A") converter 20a, and the D/A converter 20a converts the five bit current setting signal into an analog current. Then, the analog current is output as the write current setting signal "a" and the bias current setting signal "c".

Afterwards, as shown in FIG. 3c, a write data signal 13 is provided on the data signal line 13A. Since the write driver 18 and the write predriver 19 are activated via the write mode signal "b" during a write operation, the predriver 19 inputs the data signal 13, processes the data signal 13, and outputs corresponding write data. Then, the write driver 18 inputs the write data and generates a write bias current based on the write current setting signal and the value of the write data. As a result, the write head 3a writes data to the first disk 1 based on the write bias current.

In order to read data from the disk 1 via the read head 3b, a power signal 11a is selectively applied to the power source terminal (not shown) of the drive circuit 151 as a chip select signal to selectively activate such circuit 151 at a certain time. (FIG. 3a). Then, the control circuit 21 starts to input the control signal 12. Specifically, the circuit 21 synchronizes its operations in accordance with the basic clock signal during the period T0 and inputs the two-bit read/write mode and the five-bit current setting signal during the periods T1 and T2 (FIG. 3b).

Afterwards, the two-bit read/write mode signal is decoded to generate a write mode signal "b" and a read mode signal "d". Since a read operation is to be performed, the control circuit 21 outputs the read mode signal "d" to the read preamplifier 22 and the read postamplifier 23 to activate the preamplifier 22 and postamplifier 23. The five-bit current setting signal is supplied to the current setting circuit 20 and converted into an analog current via the D/A converter 20a. Then, the analog current is output as the write current setting signal "a" and the bias current setting signal "c".

When the read preamplifier 22 inputs the bias current setting signal "c", it applies a read bias current to the read head 3b. As a result, the head 3b reads data from the disk 1 and supplies it to the preamplifier 22. Then, the preamplifier 22 amplifies the signal and supplies it as output data to the read postamplifier 23. Since the postamplifier 23 is activated by the read mode signal "d", the postamplifier 23 amplifies the output data and outputs it to the data signal line 13A as a read data signal 13. (FIG. 3c).

The above example illustrates the operation of the drive circuit 151 when data is written to the disk 1 via the write head 3a and when data is read from the disk 1 via the read head 3b. The remaining drive circuits 152 to 154 operate in a similar manner when data is being written via the write heads 4a to 6a and when data is being read via the read heads 4b to 6b.

Figure 7:
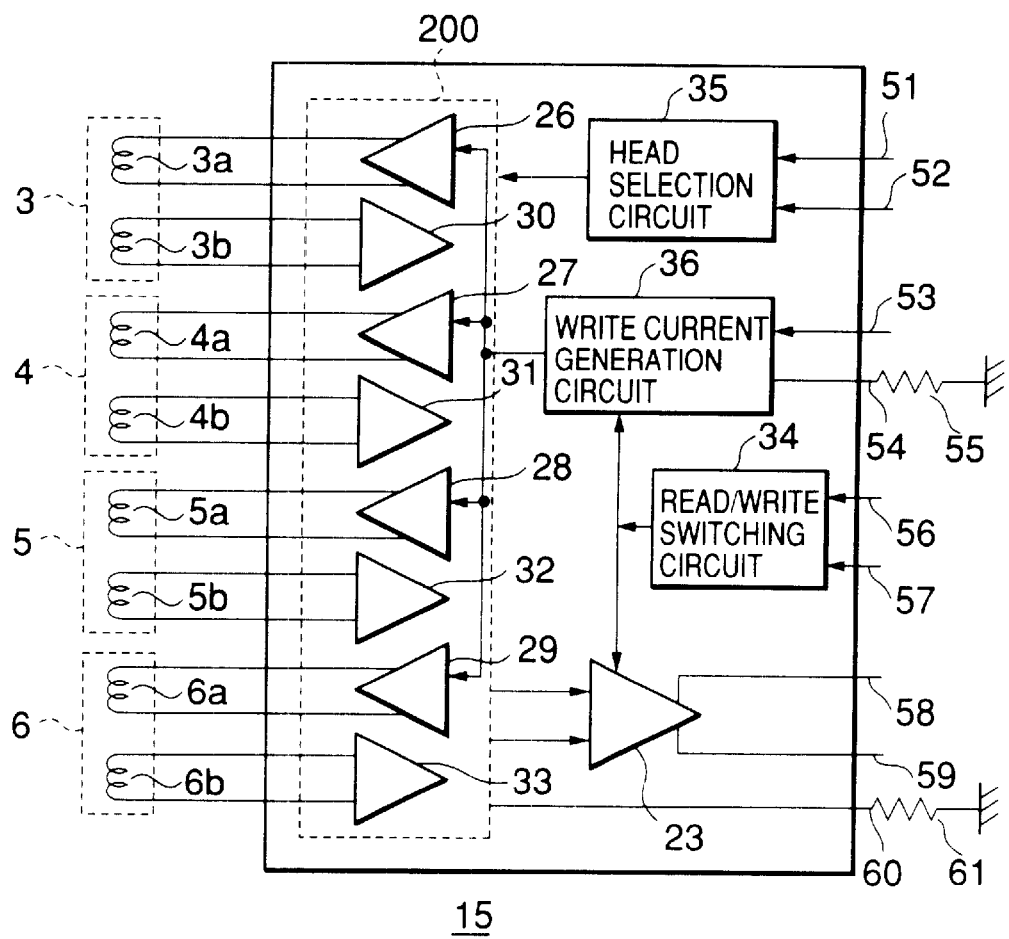
FIG. 7 is a block diagram of the conventional drive circuit.

As shown above, the drive circuits 151 to 154 contain a current setting circuit 20 for generating the currents supplied to the write driver 18 and the read preamplifier 22, and thus, they do not need to utilize the external resistors 55 and 61 shown in FIG. 7 to generate such currents. Also, since the drive circuits 151 to 154 are activated by selectively applying one of the power signals 11a to 11d as a chip selection signal to one of the circuits 151 to 154, the drive circuits 151–154 do not need to input a signal which is analogous to the chip selection signal 57 shown in FIG. 7. In addition, since each of the individual magnetic heads 3 to 6 corresponds to only one of the respective drive circuits 151 to 154, the power signals 11a to 11d which selectively activate one of the circuits 151 to 154 effectively selects one of the heads 3 to 6. Therefore, the head selection signals 51 and 52 shown in FIG. 7 are unnecessary. Finally, the drive circuits 151 to 154 input and output the read and write data signals 13 via a common data signal line 13A. Therefore, the circuits 151 to 154 do not need to use two separate data signal lines as in the conventional device shown in FIG. 7.

In other words, as seen in FIGS. 1 and 2, the drive circuits 151 to 154 of the first embodiment only need to input four signal lines: a control signal line 12, a data signal line 13, a power signal line, and a ground signal line. In contrast, the conventional drive circuit 15 shown in FIG. 7 needs to input nine signal lines: two head selection signal lines 51 and 52, a write data signal line 53, a write current setting signal line 54, a read/write selection signal line 56, a chip selection signal line 57, two read data signal lines 58 and 59, and a read current setting signal line 60. Thus, as compared with conventional drive circuits, the number of signal lines are dramatically reduced.

Also, the conventional drive circuit 15 shown in FIG. 7 needs four write drivers 26 to 29 and four read preamplifiers 30 to 33 in one semiconductor chip. On the other hand, the first embodiment loads only a write driver 18 and a read preamplifier 22 in one semiconductor chip. Therefore, the chip area of each drive circuit 151 to 154 of the embodiment can be reduced to a quarter of the size of the conventional drive circuit 15.

Since the number of lines connecting the circuits 151 to 154 to external devices and the number of externally attached elements (i.e. resistors) are considerably decreased, the actual size of the circuits 151 to 154 is small, and the chip area can be greatly reduced. Therefore, the drive circuits 151 to 154 can be disposed very close to the magnetic heads 3 to 6 near the ends of the swing arms. Accordingly, the wires between the circuits 151 to 154 and the heads 3 to 6 are very short and thus, generate very little stray capacitance and stray inductance. Therefore, the inductance of the magnetic heads 3 to 6 can be reduced, and the frequency of data writing and data reading operations can be substantially increased. As a result, the recording density of a magnetic recording device can also be increased.

Also, in the conventional drive circuit 15 shown in FIG. 7, thick wires are necessary to suppress the stray capacitance and the inductance generated by the many signals transmitted from the circuit 15 to the magnetic heads 3 to 6 and the other external components. However, as mentioned above, the wiring between the magnetic heads 3 to 6 and the drive circuits 151 to 154 are short and only carry small signals. Since the signals are small, the stray capacitance and inductance is extremely small, and thus, compensating for such capacitance and inductance is unnecessary.

With respect to the signals transmitted between the drive circuits 151 to 154 and the various external devices (e.g. a controller or signal processor such as a read channel LSI) the read data signals 13 are barely affected by stray capacitance and stray inductance because they correspond to data which has been amplified by the postamplifier 30. Also, the write data signals 13 input to the circuits 151 to 154 are barely affected by the stray capacitance and inductance because they are digital data signals. Accordingly, integrated wirings which are manufactured via an evaporation process, a metal sputtering process, or other semiconductor manufacturing process can be used as the wirings between the drive circuits 151 to 154 and the magnetic heads 3 to 6 and the wirings between the circuits 151 to 154 and the external devices.

Also, in the conventional drive circuit 15, the read and write setting currents supplied to the write drivers 26 to 29 and the preamplifiers 30 to 33 are generated by connecting resistors 55 and 61 to the circuit 15. However, in the present embodiment, the current setting circuit 20 is incorporated into the circuits 151 to 154, and a value of the current is set by a D/A converter based on serial data received from an external device. By feeding back the serial read data signal 13 to the external device, the device can evaluate the current level. Then, the external device can change the value of the current setting signal transmitted during the second period T2 of the control signal 12 to optimize the value of the current setting signals "a" and "c" supplied to the write driver 18 and the preamplifier 22, respectively. For example, if the external device (i.e. a CPU) outputs "1010" to be written to the disk, the CPU reads the same data from the disk. If the read data is different from the written data, the CPU increases the current setting signals "a" and "c".

Figure 4A:
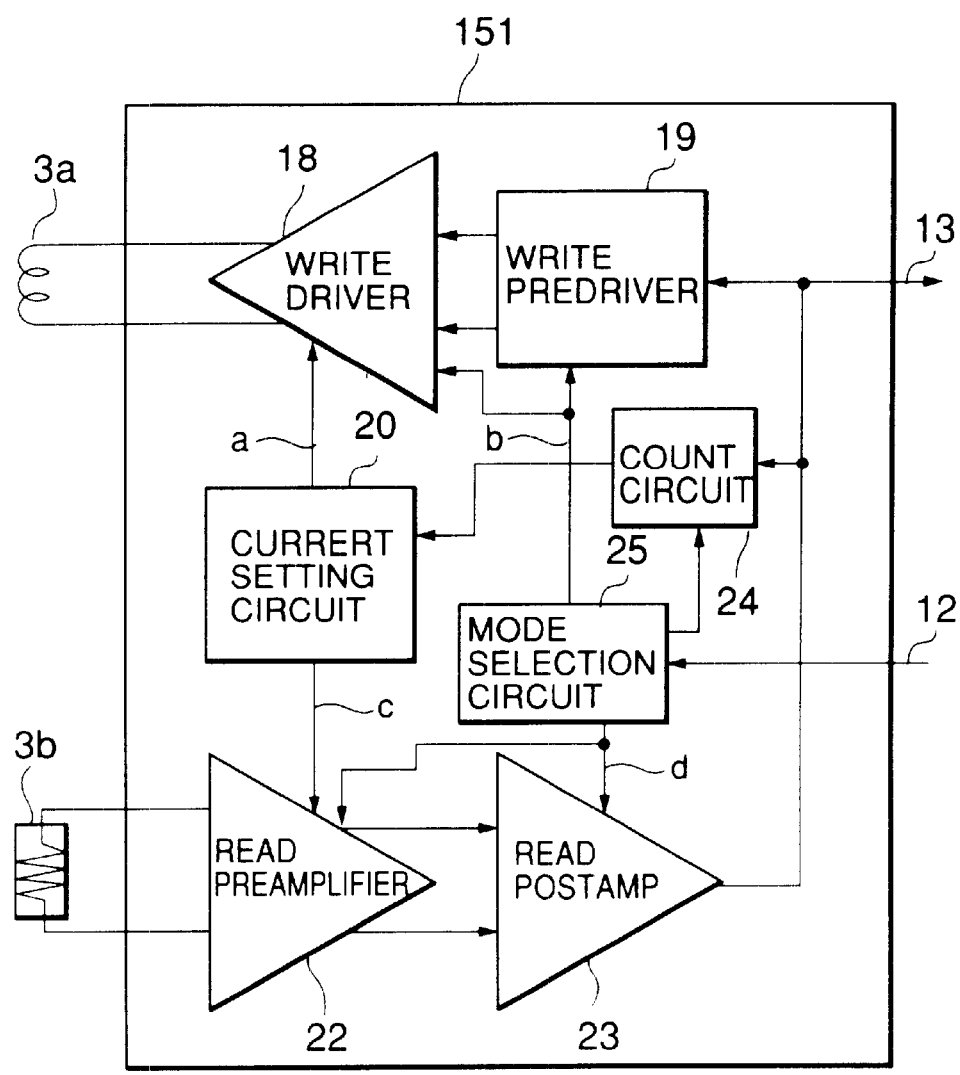
FIG. 4a is a block diagram of a drive circuit according to a second embodiment of the present invention.

FIG. 4a shows an illustrative example of the structure of the drive circuit 151 according to a second embodiment of the present invention. Also, since the circuits 152 to 154 have a similar structure, a description of such circuits 152 to 154 is omitted for the sake of brevity. Also, FIG. 5 illustrates various signals input to or output from the drive circuit 151.

As shown in FIG. 4a, the drive circuit 151 comprises a write driver 18, a write predriver 19, a current setting circuit 20, a read preamplifier 22, a read postamplifier 23, a counter circuit 24, and a mode selection circuit 25. Also, the magnetic head 3 comprises a write head 3a and a read head 3b.

In order to write data to the disk 1 via the write head 3a, a power signal 11a is selectively applied to the power source terminal (not shown) of the drive circuit 151 as a chip select signal to selectively activate such circuit 151 at a certain time. (FIG. 5a). In other words, none of the other power signals 11b to 11d are respectively supplied to the drive circuits 152 to 154.

Figure 4B:
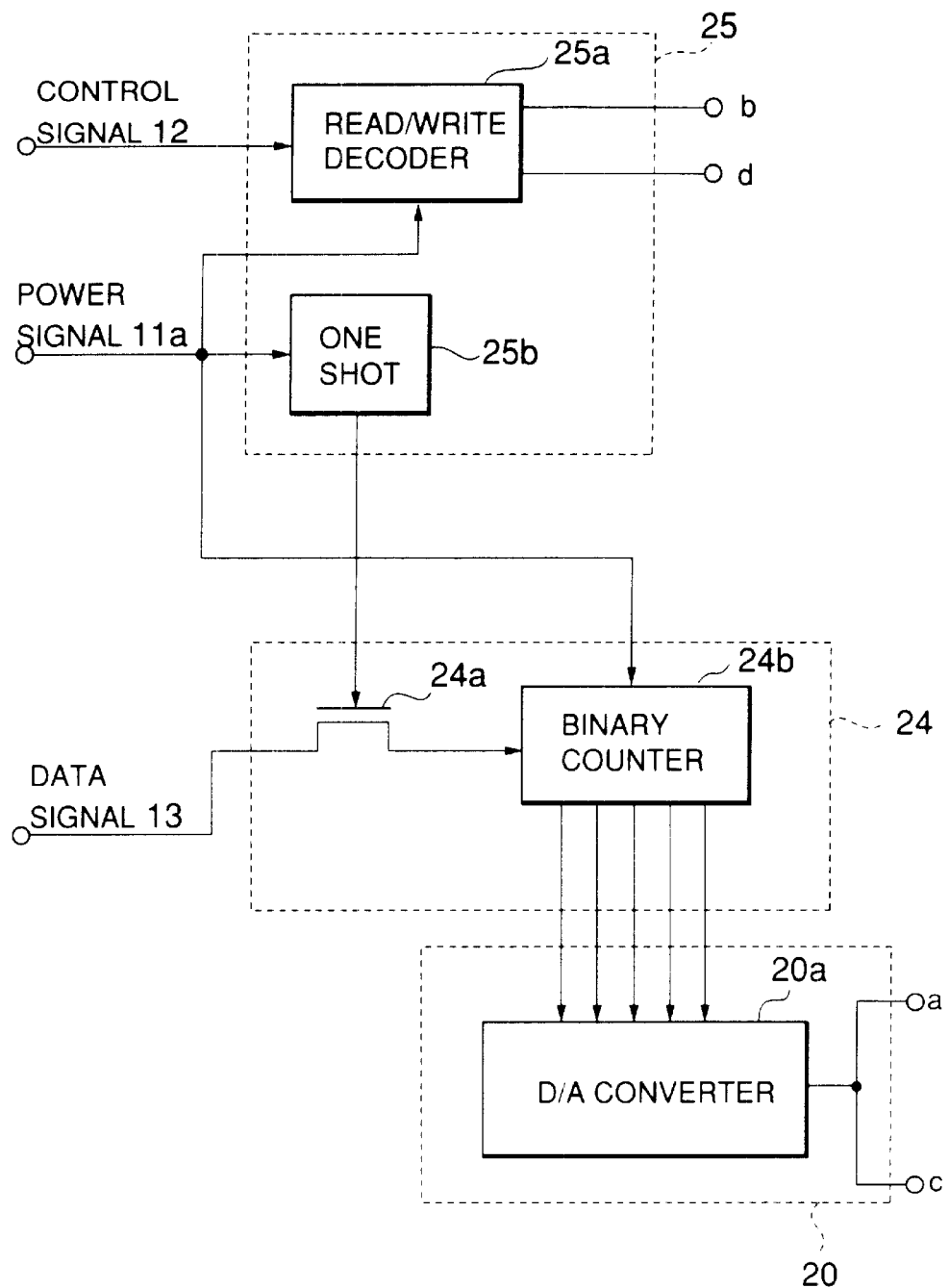
FIG. 4b is a block diagram of a counter circuit, mode selection circuit, and current setting circuit according to a second embodiment of the present invention.
Figure 6A:
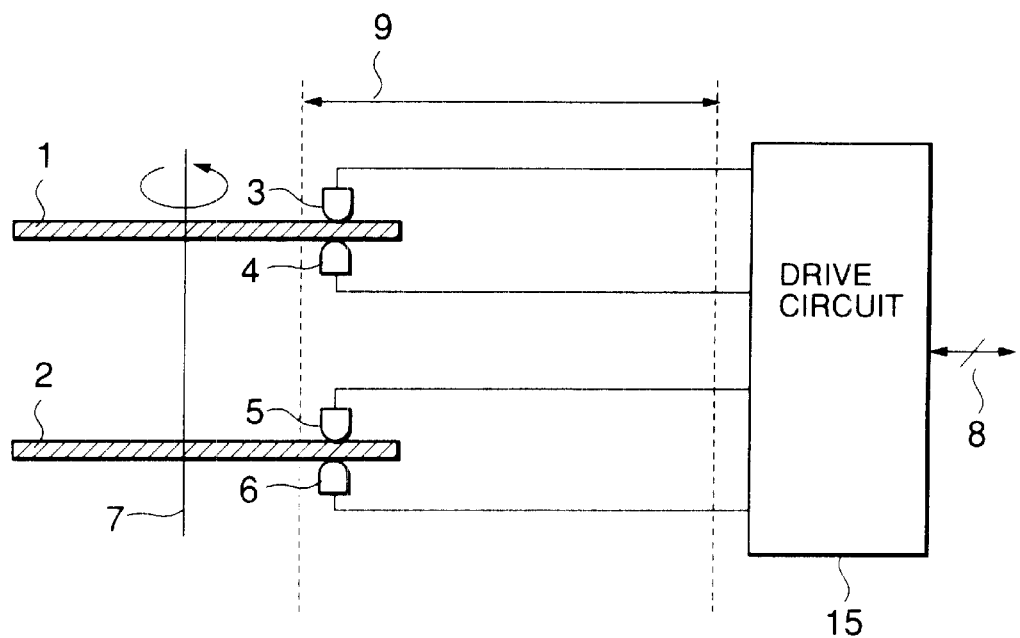
FIG. 6a is a block diagram of a magnetic recording device which incorporates a conventional drive circuit.
Figure 6B:
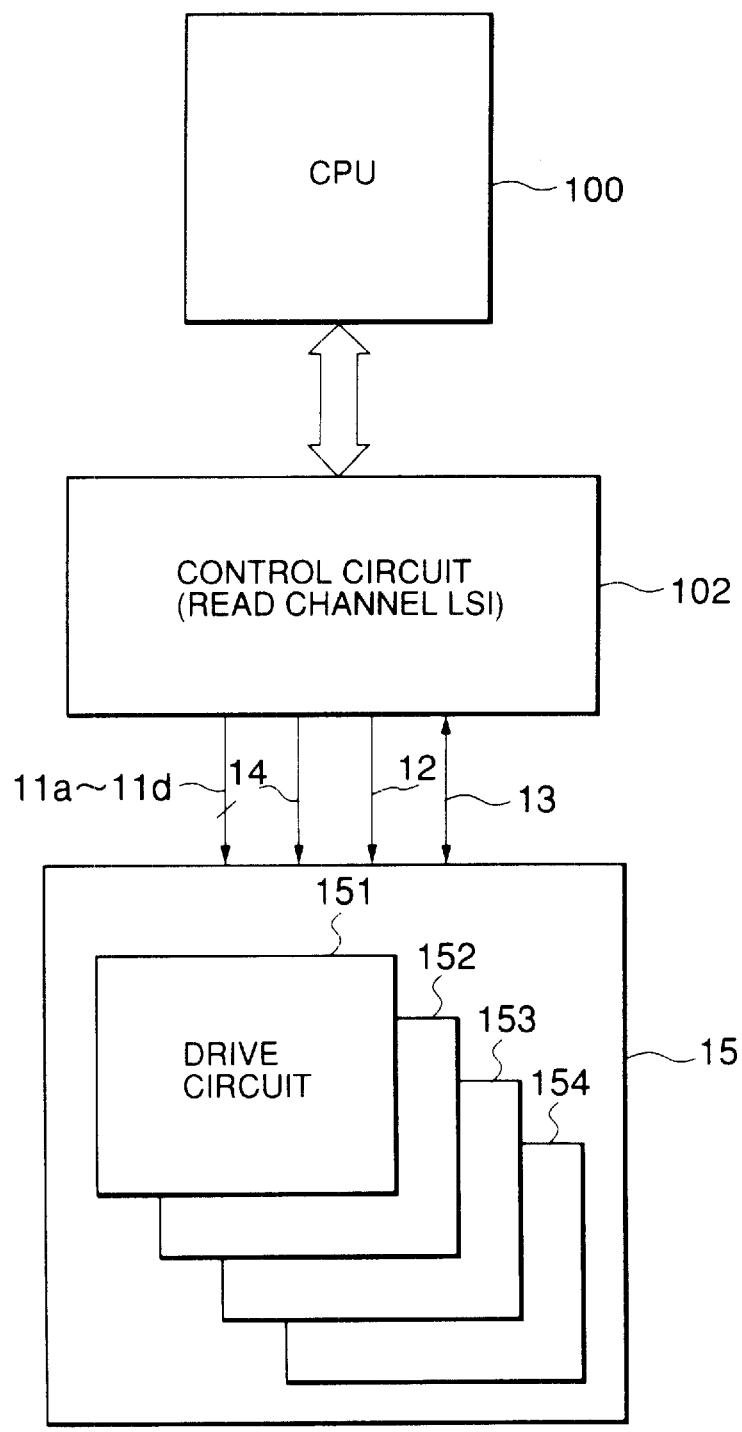
FIG. 6b is a block diagram showing an example of the interaction between a CPU, a control circuit, and a conventional drive circuit.

As shown in FIGS. 4a and 5b, the mode selection circuit 25 inputs the control signal 12 and determines if the drive circuit 151 is operating in a write mode or a read mode based on the signal 12. The signal 12 may identify a write mode if it equals "0" and may identify a read mode if it equals "1". As shown in FIG. 4b, the mode selection circuit 25 comprises a read/write decoder 25a and a one shot circuit 25b. The decoder 25a is enabled by the power signal 11a, inputs the control signal 12, and outputs the write mode signal "b" or the read mode signal "d" based on the value of the control signal 12. Also, the signals "b" and "d" may actually be the same signal but may have different values based on the values of the control signal 12. Also, the mode selection circuit 25 may simply pass on the control signal as the signals "b" and "d". The one shot circuit 25b has a time constant such that it outputs a one shot signal when the power signal 11a is initially applied to it and remains activated only for a time which corresponds to a current setting read period T4. (See FIG. 5c).

The counter circuit 24 comprises a transistor 24a and a binary counter 24b. The transistor 24a inputs the data signal 13 via its source and inputs the one shot signal via its gate. As a result, the transistor 24a only outputs the data signal when the one shot signal is being output from the one shot circuit 25b (i.e. only during the period T4). The binary counter 24b inputs the data signal 13 during the period T4 and counts the pulses contained in the data signal 13. As shown in FIG. 5c, the data signal 13 initially supplies a current setting signal C1 during the current setting read period T4 and then supplies a data signal D0, D1, D2, D3, etc. after the period T4. Thus, the binary counter 24a only counts the number of pulses in the current setting signal C1 and outputs a corresponding count value. Also, the counter 24a inputs the power signal 11a and is reset when the power signal 11a is not activated. Therefore, whenever the signal 11a is initially applied to the drive circuit 151, the count value of the counter 24b equals zero.

The current setting circuit 20 comprises a D/A converter 20a which inputs the count value and converts it into an analog current. Then, the analog current is output as the write current setting signal "a" and the bias current setting signal "c". Thus, by varying the number of pulses contained in the current setting signal C1, value of the setting current signals "a" and "c" can be changed.

As shown in FIG. 5c, a write data signal 13 is provided on the data signal line 13A after the period T4. Since the write driver 18 and the write predriver 19 are activated via the write mode signal "b" during the write mode, the predriver 19 inputs the data signal 13, processes the data signal, and outputs corresponding write data. Then, the write driver 18 inputs the write data and generates a write bias current based on the write current setting signal "a" and the value of the write data. As a result, the write head 3a writes data to the first disk 1 based on the write bias current.

In order to read data to the disk 1 via the read head 3b, the power signal 11a is applied to the drive circuit 151. Then, the counter circuit 24 counts the pulses of the current setting signal C1 during the period T4 and generates a corresponding count value. As a result, the current setting circuit 20 generates the write current setting signal "a" and the bias current setting signal "c" based on the count value. Meanwhile, the mode selection circuit 25 inputs the control signal 12 and outputs the write mode signal "b" or the read mode signal "d" based on the value of the control signal 12.

When the read preamplifier 22 inputs the bias current setting signal "c", it applies a read bias current to the read head 3b. As a result, the head 3a reads data from the disk 1 and supplies it to the preamplifier 22. Since the preamplifier 22 is activated by the read mode signal "d", it amplifies the data and supplies it as output data to the read postamplifier 23. Also, since the postamplifier 23 is activated by the read mode signal "d", the postamplifier 23 amplifies the output data and outputs it to the data signal line 13A as a read data signal 13. (FIG. 5c).

The above example illustrates the operation of the drive circuit 151 when data is written to the disk 1 via the write head 3a and when data is read from the disk 1 via the read head 3b. The remaining drive circuits 152 to 154 operate in a similar manner when data is being written via the write heads 4a to 6a and when data is being read via the read heads 4b to 6b.

In addition to the advantages mentioned above in conjunction with the first embodiment, the drive circuits 151 to 154 of the second embodiment are further simplified and the chip area is further decreased. Specifically, in the second embodiment, the drive circuits 151 to 154 do not need to be synchronized with a basic clock signal contained in the control signal 12, and therefore, no need exists to incorporate a control circuit 21 containing a PLL circuit.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed:

1. A drive circuit for a magnetic recording device, comprising:
   a write driver which inputs write data and outputs a corresponding writing current to a write head to store information onto a magnetic disk;
   a read preamplifier which supplies a bias current to a read magnetic head to sense information stored on said magnetic disk and which amplifies said information as output data;
   a write predriver which inputs a write data signal and a write mode signal and which supplies said write data to said write driver based on a write mode signal;
   a read postamplifier which inputs said output data and a read mode signal and which amplifies said output data to produce a read data signal based on said read mode signal; and
   a control circuit which inputs a control signal as serial input data and determines a current value and an operational mode of said drive circuit based on said control signal, wherein said control circuit generates said read mode signal when said operational mode is a read mode and generates said write mode signal when said operational mode is a write mode and wherein said control circuit outputs a current value signal corresponding to said current value.

2. The drive circuit as claimed in claim 1, wherein said write mode signal activates said write predriver and said read mode signal deactivates said read postamplifier during said write mode, and
   wherein said write mode signal deactivates said write predriver and said read mode signal activates said read postamplifier during said read mode.

3. The drive circuit as claimed in claim 1, further comprising:
   a current setting circuit which inputs said current value signal and outputs at least one current setting signal based on said current value signal,
   wherein said write driver is driven by said at least one current setting signal during said write mode, and
   wherein said read preamplifier is driven by said at least one current setting signal during said read mode.

4. The drive circuit as claimed in claim 3, wherein said at least one current setting signal output by said current setting circuit comprises a write current setting signal and a bias current setting signal,
   wherein said write driver is driven by said write current setting signal during said write mode, and
   wherein said read preamplifier is driven by said bias current setting signal during said read mode.

5. The drive circuit as claimed in claim 4, wherein said current setting circuit sets magnitudes of said write current setting signal and said bias current setting signal based on a value of said current value signal.

6. The drive circuit as claimed in claim 5, wherein said current setting circuit comprises:
   a digital to analog converter which inputs said current value signal and converts said current value signal into at least one of said write current setting signal and said bias current setting signal.

7. The drive circuit as claimed in claim 1, wherein said control signal comprises:
   a basic clock signal; and
   a composite signal containing a mode switching signal and an external current setting signal,
   wherein said basic clock signal precedes said mode switching signal and said external current setting signal.

8. The drive circuit as claimed in claim 7, wherein said control circuit comprises:
   a phase lock loop circuit which inputs said basic clock signal and synchronizes said control circuit with said basic clock signal;
   a data separator circuit which inputs said composite signal and separates said composite signal into said mode switching signal and said external current setting signal; and
   a decoder circuit which inputs said mode switching signal, outputs said write mode signal when said mode switching signal corresponds to said write mode, and outputs said read mode signal when said mode switching signal corresponds to said read mode.

9. The drive circuit as claimed in claim 8, wherein said control circuit outputs said external current setting signal as said current value signal.

10. The drive circuit as claimed in claim 8, wherein said data separator circuit comprises a shift register which serially inputs said mode switching signal and said external current setting signal and outputs said mode switching signal and said external current setting signal in parallel.

11. The drive circuit as claimed in claim 1, wherein said drive circuit inputs a power supply signal which selectively supplies power to said drive circuit,
    wherein said control circuit is enabled when said power supply signal supplies said power to said drive circuit, and
    wherein said control circuit is disabled when said power supply signal is not supplying power to said drive circuit.

12. A drive circuit for a magnetic recording device, comprising:
    a write driver which inputs write data and outputs a corresponding writing current to a write head to store information onto a magnetic disk based on a write current setting signal;
    a read preamplifier which supplies a bias current to a read magnetic head to sense information stored on said magnetic disk and which amplifies said information as output data based on a bias current setting signal;
    a write predriver which inputs a write data signal and a write mode signal and which supplies said write data to said write driver based on a write mode signal;
    a read postamplifier which inputs said output data and a read mode signal and which amplifies said output data to produce a read data signal based on said read mode signal;
    a control circuit which inputs a control signal as serial input data and generates said read mode signal when said control signal identifies a read mode of said drive circuit, generates said write mode signal when said control signal identifies a write mode, and outputs a current value signal based on said control signal; and
    a current setting circuit which inputs said current value signal and outputs said write current setting signal and said bias current setting signal based on said current value signal.

13. The drive circuit as claimed in claim 12, wherein said write mode signal activates said write predriver and said read mode signal deactivates said read postamplifier during said write mode, and wherein said write mode signal deactivates said write predriver and said read mode signal activates said read postamplifier during said read mode.

14. The drive circuit as claimed in claim 13, wherein said control signal comprises:
   a basic clock signal; and
   a composite signal containing a mode switching signal and an external current setting signal,
   wherein said basic clock signal precedes said mode switching signal and said external current setting signal,
wherein said control circuit comprises:
   a phase lock loop circuit which inputs said basic clock signal and synchronizes said control circuit with said basic clock signal;
   a data separator circuit which inputs said composite signal and separates said composite signal into said mode switching signal and said external current setting signal; and
   a decoder circuit which inputs said mode switching signal, outputs said write mode signal when said mode switching signal corresponds to said write mode, and outputs said read mode signal when said mode switching signal corresponds to said read mode, and
wherein said control circuit outputs said external current setting signal as said current value signal.

15. The drive circuit as claimed in claim 14, wherein said current setting circuit comprises:
   a digital to analog converter which inputs said current value signal and converts said current value signal into said write current setting signal and said bias current setting signal.

16. The drive circuit as claimed in claim 15, wherein said data separator circuit comprises a shift register which serially inputs said mode switching signal and said external current setting signal and outputs said mode switching signal and said external current setting signal in parallel.

17. The drive circuit as claimed in claim 14, wherein said drive circuit inputs a power supply signal which selectively supplies power to said drive circuit,
   wherein said control circuit is enabled when said power supply signal supplies said power to said drive circuit, and
   wherein said control circuit is disabled when said power supply signal is not supplying power to said drive circuit.

18. A drive circuit for a magnetic recording device, comprising:
   a write driver which inputs write data and outputs a corresponding writing current to a write head to store information onto a magnetic disk;
   a read preamplifier which supplies a bias current to a read magnetic head to sense information stored on said magnetic disk and which amplifies said information as output data;
   a write predriver which inputs a write data signal via a data signal line and a write mode signal and which supplies said write data to said write driver based on said write mode signal;
   a read postamplifier which inputs said output data and a read mode signal and which amplifies said output data to produce a read data signal based on said read mode signal; and
   a current signal detecting circuit which inputs an external current setting signal via said data signal line and generates a current value signal based on said external current setting signal.

19. The drive circuit as claimed in claim 18, further comprising:
   a mode selection circuit which inputs a control signal and generates said write mode signal and said read mode signal based on said control signal.

20. The drive circuit as claimed in claim 19, wherein said write mode signal activates said write predriver and said read mode signal deactivates said read postamplifier during said write mode, and
   wherein said write mode signal deactivates said write predriver and said read mode signal activates said read postamplifier during said read mode.

21. The drive circuit as claimed in claim 18, further comprising:
   a current setting circuit which inputs said current value signal and outputs at least one current setting signal based on said current value signal,
   wherein said write driver is driven by said at least one current setting signal during said write mode, and
   wherein said read preamplifier is driven by said at least one current setting signal during said read mode.

22. The drive circuit as claimed in claim 21, wherein said at least one current setting signal output by said current setting circuit comprises a write current setting signal and a bias current setting signal,
   wherein said write driver is driven by said write current setting signal during said write mode, and
   wherein said read preamplifier is driven by said bias current setting signal during said read mode.

23. The drive circuit as claimed in claim 22, wherein said current setting circuit sets magnitudes of said write current setting signal and said bias current setting signal based on a value of said current value signal.

24. The drive circuit as claimed in claim 23, wherein said current setting circuit comprises:
   a digital to analog converter which inputs said current value signal and converts said current value signal into said write current setting signal and said bias current setting signal.

25. The drive circuit as claimed in claim 19, wherein said drive circuit inputs a power supply signal which selectively supplies power to said drive circuit,
   wherein said mode selection circuit is enabled when said power supply signal supplies said power to said drive circuit, and
   wherein said mode selection circuit is disabled when said power supply signal is not supplying power to said drive circuit.

26. The drive circuit as claimed in claim 18, wherein said external current setting signal comprises a certain number of pulses transmitted in a predetermined time period,
   wherein said current signal detecting circuit contains a counter circuit which counts said pulses during said predetermined time period to obtain a counted value and outputs said counted value as said current value signal.

27. The drive circuit as claimed in claim 26, wherein said external current setting signal is transmitted on said data signal at a time when data transfer operations are not performed by said drive circuit.

28. The drive circuit as claimed in claim 26, wherein said drive circuit inputs a power supply signal which selectively supplies power to said drive circuit, wherein said mode selection circuit is enabled when said power supply signal supplies said power to said drive circuit, and wherein said mode selection circuit is disabled when said power supply signal is not supplying power to said drive circuit.

29. The drive circuit as claimed in claim 28, wherein said predetermined time period during which said external current setting signal is transmitted occurs before said data transfer operations, wherein said mode selection circuit comprises:
a one shot circuit which inputs said power signal and outputs an activating pulse which lasts until an end of said predetermined time period; and
a read/write decoder which inputs said control signal and outputs said read mode signal and said write mode signal based on said control signal.

30. The drive circuit as claimed in claim 29, wherein said current signal detecting circuit comprises:
a switch circuit which is conductive in response to said activating pulse, which inputs said external current setting signal, and which outputs said external current setting signal to said counter circuit when said activating pulse is output.

31. A drive circuit for a magnetic recording device, comprising:
a write driver which is driven by said a current setting signal, inputs write data, and outputs a corresponding writing current to a write head to store information onto a magnetic disk;
a read preamplifier which is driven by a bias current setting signal, supplies a bias current to a read magnetic head to sense information stored on said magnetic disk, and amplifies said information as output data;
a write predriver which inputs a write data signal via a data signal line and a write mode signal and which supplies said write data to said write driver based on said write mode signal;
a read postamplifier which inputs said output data and a read mode signal and which amplifies said output data to produce a read data signal based on said read mode signal;
a current signal detecting circuit which inputs an external current setting signal via said data signal line and generates a current value signal based on said external current setting signal;
a mode selection circuit which inputs a control signal and generates said write mode signal and said read mode signal based on said control signal; and
a current setting circuit which inputs said current value signal and outputs said write current setting signal and said bias current setting signal based on said current value signal.

32. The drive circuit as claimed in claim 31, wherein said current setting circuit comprises:
a digital to analog converter which inputs said current value signal and converts said current value signal into said write current setting signal and said bias current setting signal.

33. The drive circuit as claimed in claim 32, wherein said drive circuit inputs a power supply signal which selectively supplies power to said drive circuit, wherein said mode selection circuit is enabled when said power supply signal supplies said power to said drive circuit, and wherein said mode selection circuit is disabled when said power supply signal is not supplying power to said drive circuit.

34. The drive circuit as claimed in claim 33, wherein said external current setting signal comprises a certain number of pulses transmitted in a predetermined time period, wherein said current signal detecting circuit contains a counter circuit which counts said pulses to obtain a counted value and outputs said counted value as said current value signal.

35. The drive circuit as claimed in claim 34, wherein said external current setting signal is transmitted on said data signal before data transfer operations are performed by said drive circuit.

36. The drive circuit as claimed in claim 35, wherein said predetermined time period during which said external current setting signal is transmitted occurs before said data transfer operations, wherein said mode selection circuit comprises:
a one shot circuit which inputs said power signal and outputs an activating pulse which lasts until an end of said predetermined time period; and
a read/write decoder which inputs said control signal and outputs said read mode signal and said write mode signal based on said control signal.

37. The drive circuit as claimed in claim 36, wherein said current signal detecting circuit comprises:
a switch circuit which is conductive in response to said activating pulse, which inputs said external current setting signal, and which outputs said external current setting signal to said counter circuit when said activating pulse is output.

* * * * *